United States Patent

Tame

[11] Patent Number: 5,732,923
[45] Date of Patent: Mar. 31, 1998

[54] VEHICLE SEAT TRACT ASSEMBLY WITH SECONDARY SYSTEM

[75] Inventor: Omar D. Tame, W. Bloomfield, Mich.

[73] Assignee: Atoma International, Inc., Markham, Canada

[21] Appl. No.: 760,874

[22] Filed: Dec. 9, 1996

[51] Int. Cl.$^6$ .................................................. B60N 2/08
[52] U.S. Cl. ........................... 248/430; 297/216.18
[58] Field of Search ..................... 297/216.1, 216.18; 296/68.1; 248/424, 429, 430; 188/306, 322.5

[56] References Cited

U.S. PATENT DOCUMENTS

| | | | |
|---|---|---|---|
| 5,172,882 | 12/1992 | Nini | 248/430 |
| 5,269,397 | 12/1993 | Kawamoto et al. | 188/322.5 X |
| 5,358,207 | 10/1994 | West | 248/430 |
| 5,481,941 | 1/1996 | Premji | 248/430 X |

FOREIGN PATENT DOCUMENTS

| | | | |
|---|---|---|---|
| 2506692 | 12/1982 | France | 297/216.18 |
| 3518949 | 11/1986 | Germany | 297/216.18 |
| 3536545 | 4/1987 | Germany | 297/216.18 |

*Primary Examiner*—Peter R. Brown
*Attorney, Agent, or Firm*—Cushman, Darby & Cushman IP Group of Pillsbury Madison & Sutro LLP

[57] ABSTRACT

A vehicle seat track assembly includes an elongated fixed track structure constructed and arranged to be fixed to a vehicle floor and a movable track structure cooperable with the fixed track structure. A plurality of rolling elements are engaged between track structures for rollingly supporting the movable track structure on the fixed track structure to enable the movable track structure to be moved in opposite directions through a range of adjusting movements with respect to the fixed track structure. An adjusting mechanism IS operatively associated with the track structures and is constructed and arranged to permit the movable track structure to be moved through the adjusting movements. The adjusting mechanism includes a locking and releasing device constructed and arranged to be moved between (1) a locking position preventing the adjusting movements from being affected and (2) a releasing position wherein the locking and releasing device is operable to release the adjusting mechanism to permit the adjusting movements. A lock and release system is operatively associated with the track structures and includes locking structure movable between a released position permitting the adjusting movements and a locked position preventing the adjusting movements from being affected. The lock and release system includes shock responsive structure constructed and arranged to move the locking structure to the locked position thereof in response to a crash condition which occurs while the locking and releasing device is in the releasing position thereof.

11 Claims, 6 Drawing Sheets

VEHICLE SEAT TRACT ASSEMBLY WITH SECONDARY SYSTEM

BACKGROUND OF THE INVENTION

This invention relates to a track assembly of a vehicle seat and, more particularly, to an adjustable vehicle seat track assembly having a secondary lock system for preventing unwanted fore and aft movement of movable tracks of the assembly during a crash condition which may occur when the vehicle seat is being adjusted.

Seat track assemblies are conventional equipment in adjustable vehicle seats. Usually, there are two seat track assemblies utilized to adjustably support a single vehicle seat. Each seat track assembly comprises basically a pair of track structures and a set of rolling elements. The rolling elements are utilized to rollingly support a movable one of the track structures on a fixed one of the track structures. The fixed track structure is typically fixed to the vehicle floor and the movable track structure supports a portion of the vehicle seat. The rolling support provided by the rolling elements enables the movable track structure with the seat attached to be moved fore and aft into a multiplicity of adjusted positions.

With non-powered, manually adjustable seats, manual actuation generally involves actuating a pull bar disposed under the seat which moves a locking and releasing device from a locking position into a releasing position, permitting the movable track structure and the seat mounted thereon to be moved into the desired position of adjustment. Once in the desired position, the pull bar is released and the locking and releasing device returns to the locking position thereof locking the movable track structure with respect to the fixed track structure.

When manually adjustable seats are employed in vehicles, generally, the vehicle owner's manual instructs the operator to avoid adjusting the seat while the vehicle is operating. However, it has been determined that drivers and passengers tend not to heed these warnings and will adjust the vehicle seat while the vehicle is in motion. If the vehicle seat is being adjusted during vehicle operation and crash condition occurs, injury to the passenger may occur as a result of the impact force being transferred to the unlocked vehicle seat.

Accordingly, a need exists to provide a non-powered adjustable vehicle seat track assembly which controls movement of the movable track structures in response to the sensing of a vehicle crash condition which occurs while the primary locking and releasing device is in a releasing position.

SUMMARY OF THE INVENTION

An object of the present invention is to fulfill the need referred to above. In accordance with the principles of the present invention, this objective is obtained by providing a vehicle seat track assembly including an elongated fixed track structure constructed and arranged to be fixed to a vehicle floor and a movable track structure cooperable with the fixed track structure. A plurality of rolling elements are engaged between track structures for rollingly supporting the movable track structure on the fixed track structure to enable the movable track structure to be moved in opposite directions through a range of adjusting movements with respect to the fixed track structure. An adjusting mechanism is operatively associated with the track structures and is constructed and arranged to permit the movable track structure to be moved through the adjusting movements. The adjusting mechanism includes a locking and releasing device constructed and arranged to be moved between (1) a locking position preventing the adjusting movements from being affected and (2) a releasing position wherein the locking and releasing device is operable to release the adjusting mechanism to permit the adjusting movements. A lock and release system is operatively associated with the track structures and includes locking structure movable between a released position permitting the adjusting movements and a locked position preventing the adjusting movements from being affected. The secondary lock and release system includes shock responsive structure constructed and arranged to move the locking structure to the locked position thereof in response to a crash condition which occurs while the locking and releasing device is in the releasing position thereof.

Other objects, features and characteristics of the present invention, as well as the function of the related elements of the structure, and the combination of the parts and economics of manufacture, will become apparent upon consideration of the following detailed description and the appended claims with reference to the accompanying drawings, all of which form a part of this specification.

DETAILED DESCRIPTION OF THE PRESENTLY PREFERRED EXEMPLARY EMBODIMENTS

Figure 1:
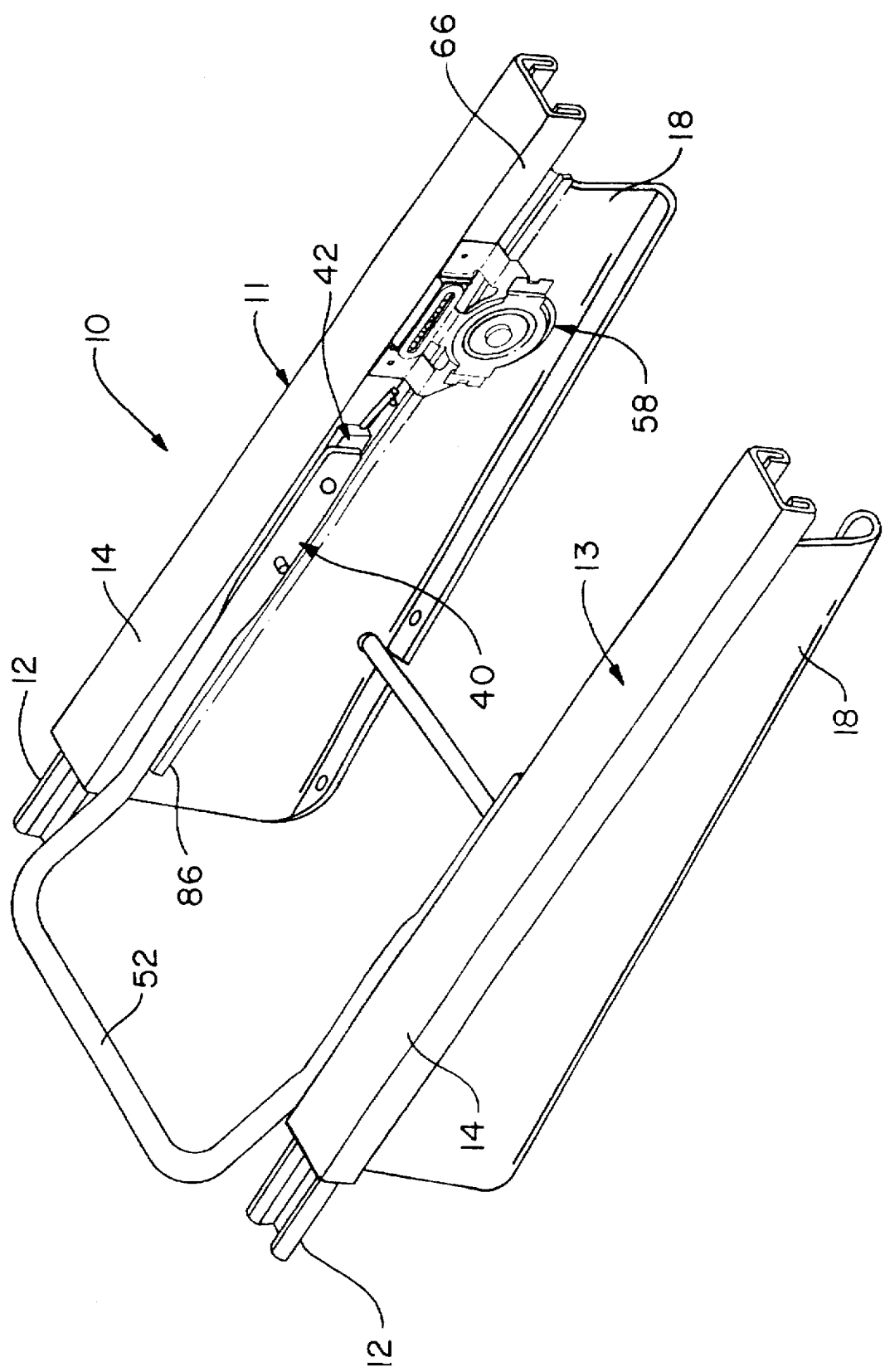
FIG. 1 is a perspective view of a vehicle seat track assembly including a lock and release system, provided in accordance with the principles of the present invention.

Referring to the drawings, a vehicle seat track system is shown, generally indicated at 10, which embodies the principles of the present invention. In the illustrated embodiment of FIG. 1, the track system 10 includes a pair of spaced track assemblies 11 and 13. Each track assembly 11 and 13 includes an elongated, fixed track structure 12, and a cooperating elongated movable track structure 14. Each basic track assembly also includes a plurality of rolling elements 16 (FIG. 6) of the type disclosed in the commonly assigned U.S. patent application Ser. No. 08/527,727 filed on Sept. 13, 1995, the disclosure of which is hereby incorporated by reference into the present specification. With reference to FIG. 1, each fixed track structure 12 may be fastened to an associated vehicle seat riser 18, and the risers can be fastened directly to a floor of the vehicle by bolting. The risers may be of any configuration for securing the fixed track structures to the vehicle floor. It can be appreciated that the risers 18 could be coupled to a lower set of tracks (not shown) mounted in fixed parallel relation on the vehicle floor. The lower tracks are operable to provide for the movement of the system 10 to a seat access position disposed forwardly of a selected seat operating position permitting easy entry to a rear passenger compartment of a vehicle.

Each fixed track structure 12 is preferably made of sheet steel bent to provide a fixed track member including an elongated lower central portion 22 having a pair of elongated upstanding leg portions 24 extending upwardly therefrom terminating in a pair of outwardly flared upwardly facing convex portions 26 having depending free end portions 28. Each movable track structure 14 is likewise preferably made of sheet steel bent to provide a movable track member including an elongated upper central portion 30 having a pair of elongated transversely spaced downwardly facing convex depressions 32 formed integrally on opposite edges thereof and a pair of elongated depending leg portions 34 extending downwardly from opposite edges of the convex depressions terminating in a pair of downwardly facing convex portions 36 having upstanding free end portions 38. The movable track structures 14 are constructed and arranged to enable a vehicle seat cushion assembly (not shown) to be mounted thereon.

The track members 12 and 14 are constructed and arranged to be telescopically interengaged in cooperating relation to one another so that the pair of upwardly facing convex portions 26 of each fixed track member 12 is disposed below the pair of downwardly facing convex depressions 32 and above the upstanding free end portions 38 of an associated movable track member 14. Preferably, the pair of upwardly facing convex portions 26 of the fixed track member 12 and the pair of downwardly facing convex depressions 32 of the movable track member 14 all provide convexly arcuate surfaces.

Each of the roller elements 16 comprises a roller having an annular groove of arcuate cross-sectional configuration formed in a central exterior periphery thereof providing arcuate annular surfaces operable to rollingly engage the convex arcuate surfaces of an associated downwardly facing convex depressions 32 and upwardly facing convex portions 26 respectively through a central angular extent thereof, as, for example, 30°. Preferably, each of the rollers 16 is made of steel.

Figure 7:
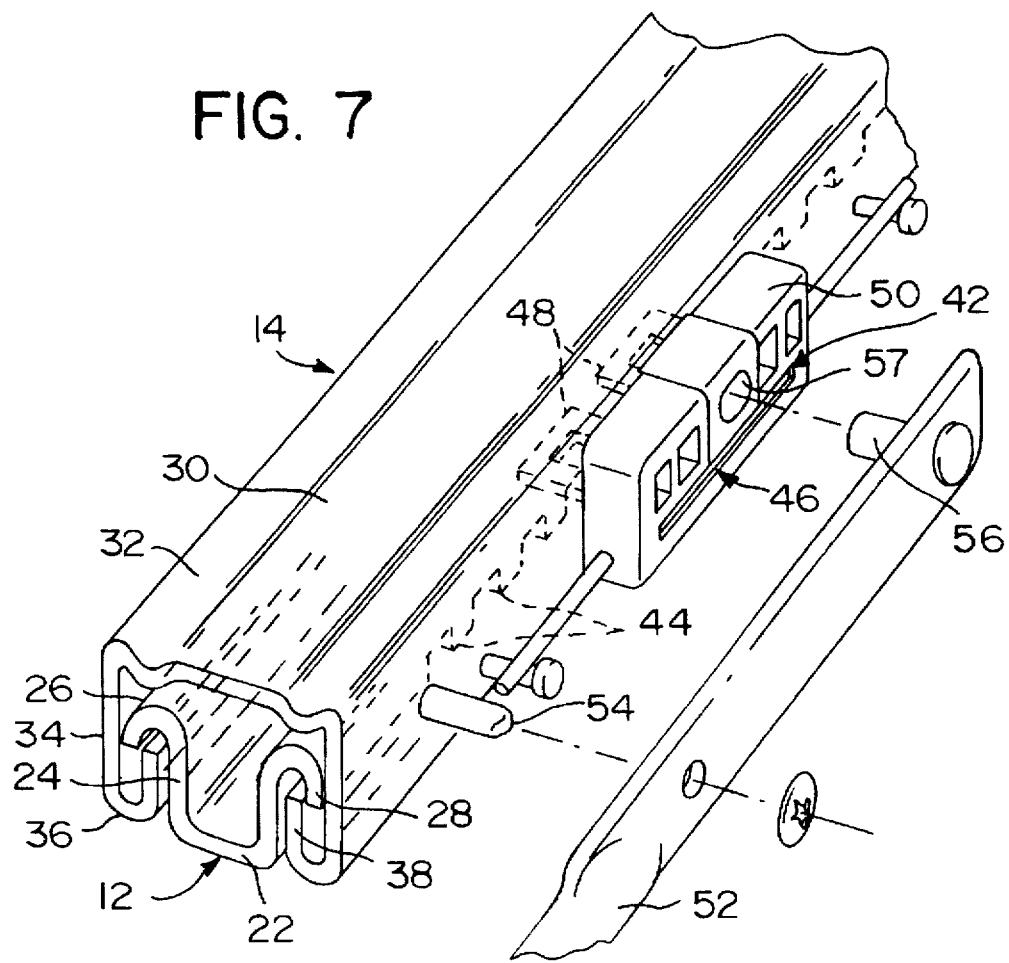
FIG. 7 is a perspective view of the adjusting mechanism shogun mounted on a track assembly.

To manually adjust the position of the movable track members with respect to the fixed track members, an adjusting mechanism is associated with each pair of fixed and movable track members. The adjusting mechanism, generally indicated at 40, is of the type disclosed in the above-referenced U.S. patent application Ser. No. 08/527,727 wherein a locking and releasing device, generally indicated at 42, is provided. As best shown in FIG. 7, to accommodate the locking and releasing device 42, one of the depending free end portions 28 of the fixed track member 12 is formed with a series of equally spaced downwardly opening notches 44. A corresponding one of the depending leg portions 34 of the movable track member 14 has a plurality of vertically extending parallel slots (not shown) formed therein which are spaced apart so as to correspond with the spacing of the notches 44.

The locking and releasing device 42 itself includes a pair of abutting metal plates, generally indicated at 46, stamped to provide a plurality of spaced abutting notch-entering locking portions 48 extending transversely therefrom to extend through and beyond the spaced vertically extending slots in the one depending leg portion 34. Preferably, corresponding slots are also formed in the corresponding upstanding end portion of the track member 14.

The locking and releasing device 42 also includes a mounting structure 50 which is preferably in the form of a molded plastic body having a recess formed in an outer face thereof which receives the abutting mounting portions of the abutting plates 46 therein and a pair of spaced openings extending from the recess to an opposite face thereof through which the abutting locking portions 48 of the abutting plates 46 extend. As disclosed in U.S. patent application Ser. No. 08/527,727, the mounting structure 50 is spring biased upwardly into a locking position with the locking portions 48 engaged within the notches 44. From the locking position, the locking and releasing device 42 may be moved downwardly against the spring action into a lower, releasing position. To facilitate this movement, as shown in FIG. 1, a manual actuating member, such as U-shaped member 52 is coupled between the locking and releasing device 42 associated with each track assembly 11 and 13. The U-shaped member 52 has its legs flattened and is apertured intermediate the flattened ends thereof. The aperture in each flattened end rotatably receives a shaft 54 fixed as by a threaded engagement to the leg portion 34 of the movable track member 14. The rearward end of the flattened portion of each leg includes a pin 56 which extends laterally therefrom and is engaged within a horizontally elongated opening 57 formed in the central exterior portion of the mounting structure 50 at a position above the locking plates as shown in FIG. 7. Manual upward movement of the U-shaped member 52 causes the locking and releasing device 42 to move downwardly against the bias thereon into a releasing position with the locking portions 48 removed from engagement with the notches 44, thereby permitting fore and aft movement of the movable track members 14 through a range of adjusting positions.

Adjustment of the manually movable track assemblies should always be performed while the vehicle is not operating. It has been determined, however, that many drivers and/or passengers adjust their seats while the vehicle is operating. If the locking and releasing device 42 is in its releasing position during a crash condition, the force of the impact may be transferred to the free moving vehicle seat which may cause injury to the seat occupant.

Figure 2:
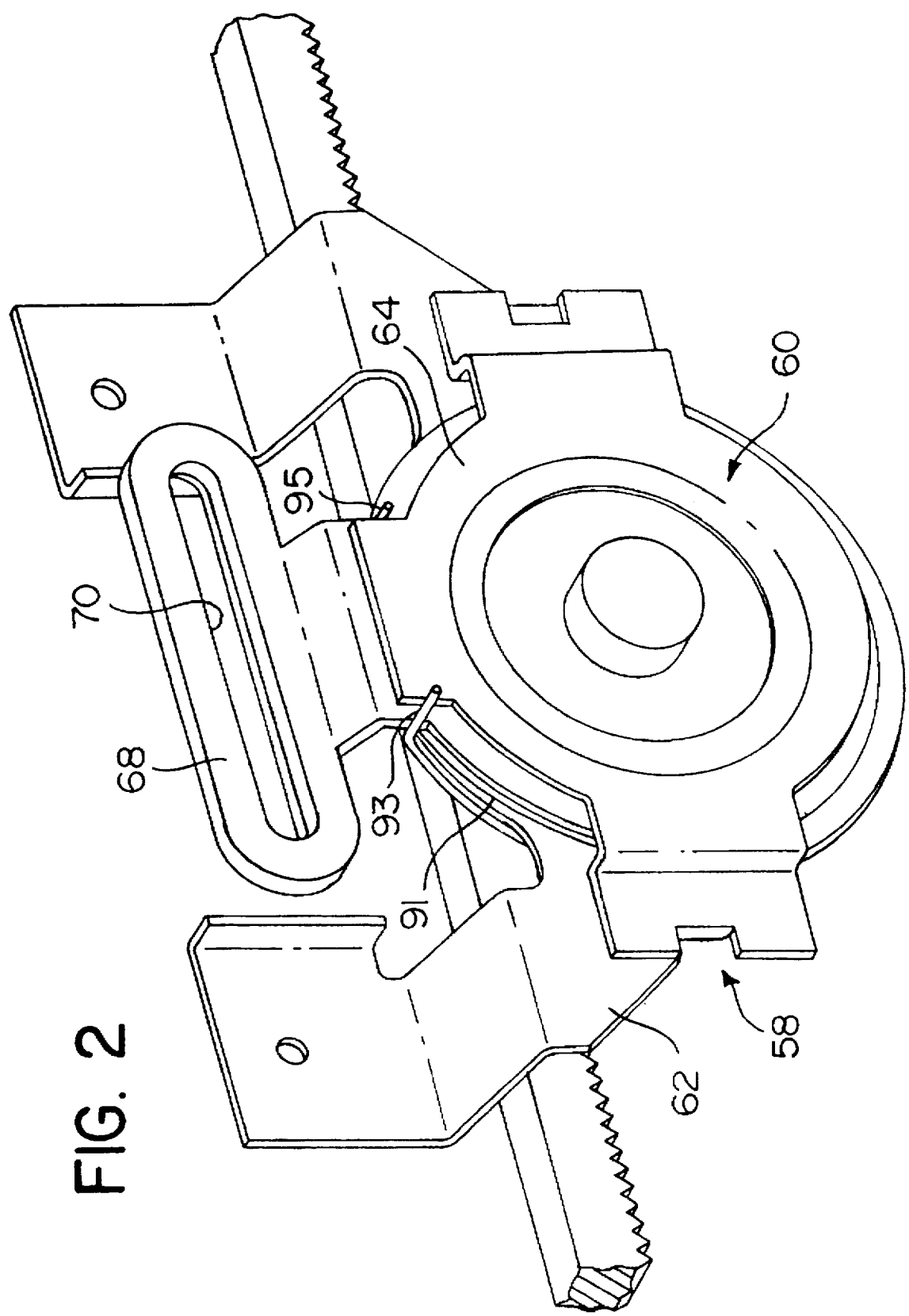
FIG. 2 is an front enlarged perspective view of shock responsive structure of the lock and release system of FIG. 1.

In accordance with the invention, a lock and release system, generally indicated at 58, defining a secondary lock system is operatively associated with at least one of the track assemblies 11 and 13. The lock and release system 58 includes shock responsive structure, generally indicated at 60. With reference to FIG. 2, the shock responsive structure in the form of a hydraulic coupling device 60 includes rear bracket 62, a front bracket 64 coupled thereto, and a movable member 65 disposed between the brackets 62 and 64. The rear bracket 62 is mounted to an inside sidewall 66 of at least one of the movable track members 14 so as to be movable fore and aft therewith. The movable member 65 is mounted for rotational movement with respect to axis A (FIG. 6) and includes an arm portion 68 extending therefrom. The arm portion 68 includes an elongated slot 70 therein, the function of which will become apparent below.

Figure 5:
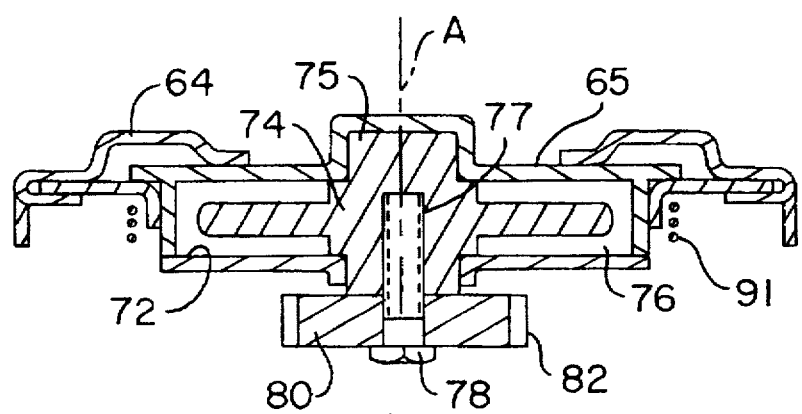
FIG. 5 is a cross-sectional view taken along the line 5—5 in FIG. 4.
Figure 6:
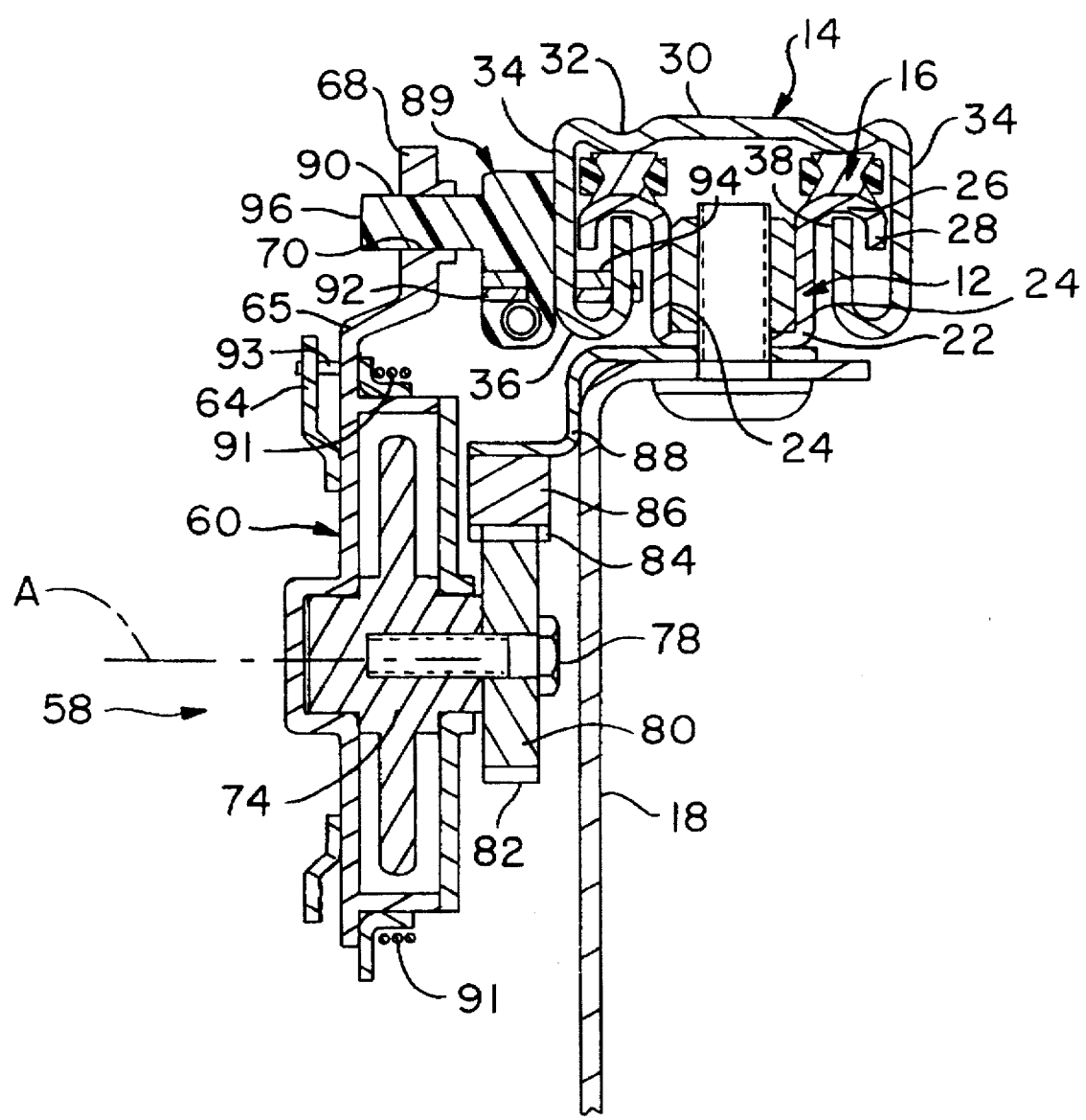
FIG. 6 is a cross-sectional view of the lock and release system shown operatively associated with a track assembly.

With reference to FIG. 5, the movable member 65 defines an interior cavity 72. A shock responsive member 74 is sealing received within the cavity and mounted for rotation in either direction. Portion 75 of member 74 is coupled to the movable member 65 such that, under certain conditions, movable member 65 will rotate together with the member 74 and under other conditions, the member 74 will rotate without causing the movable member 65 to rotate, as will be explained more fully below. A fluid, such as oil 76, fills the cavity 72. Member 74 includes female threads 77 which receive a screw 78. Screw 78 couples a pinion 80 to the shock responsive member 74. Thus, as explained below, rotational motion of the pinion 80 will cause the member 74 to rotate in cavity 72. The pinion 80 includes a plurality of teeth 82 defined in the periphery thereof. The teeth 82 are constructed and arranged to mate with teeth 84 defined on a rack 86 which is secured to the fixed track structure 12 via bracket 88 (FIG. 6). The function of the rack 86 and pinion 88 will become apparent below.

Figure 4:
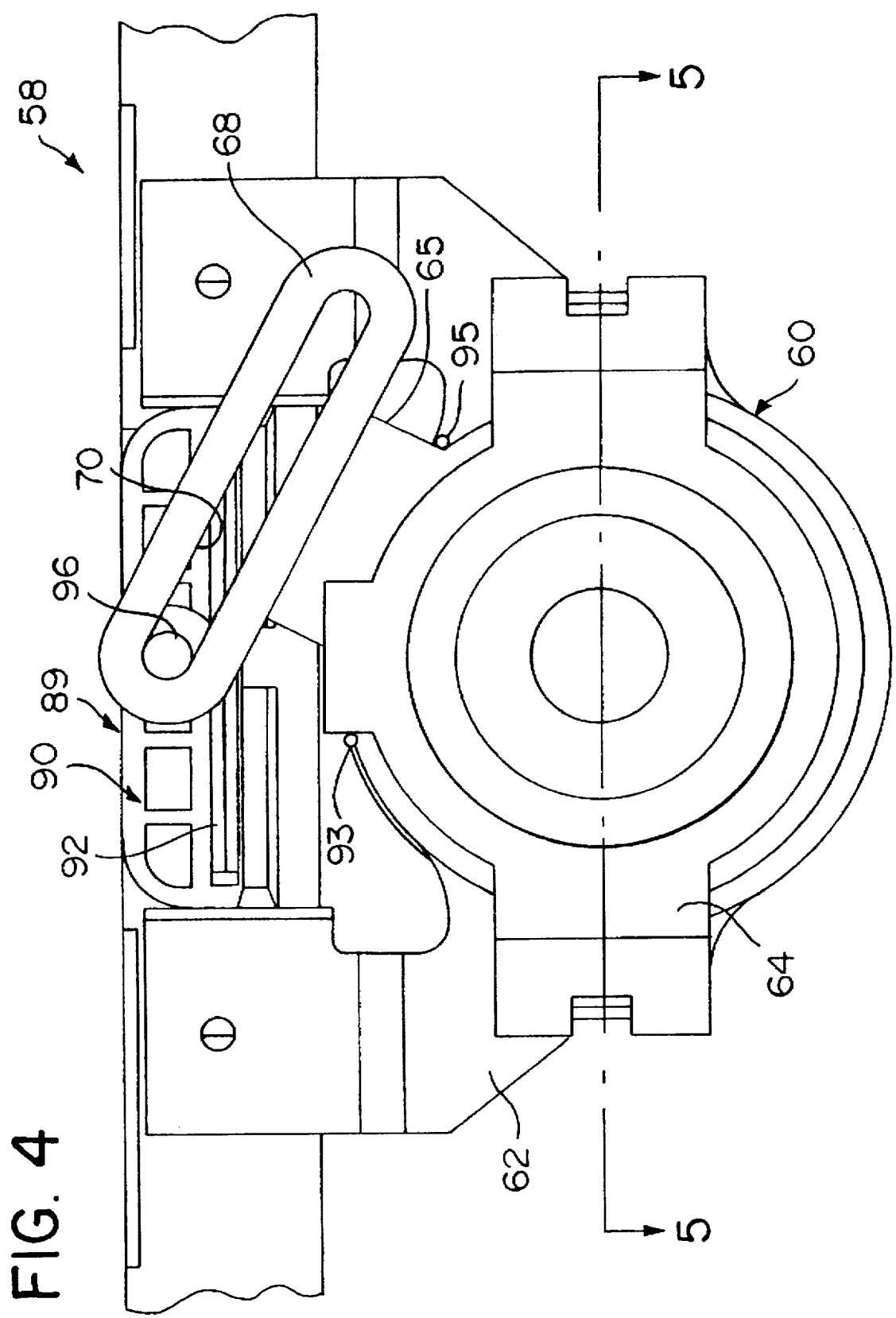
FIG. 4 is an enlarged front view of the lock and release system of the invention, shown in a locked position thereof.

With reference to FIGS. 4 and 6, the lock and release system 58 includes locking structure, generally indicated at 89, which is movable between a released position permitting the adjusting movements of the movable track members 14 to be affected and a locked position preventing any adjusting movements from occurring. The locking structure 89 includes a mounting member or structure, generally indicated at 90, which is substantially similar to the mounting structure 50 described above. The mounting member 90 is preferably in the form of a molded plastic body having a recess formed in an outer face thereof which receives abutting plates 92 therein and a pair of spaced openings extending from the recess to an opposite face thereof through which abutting locking portions or members 94 of the abutting plates 92 extend, in a manner generally identical to that described above with regard to the locking and releasing device 40. The locking structure 89 includes a shaft 96 extending generally transversely from a side of the mounting structure 90, which is received in the slot 70 of arm portion 68.

The mounting member 90 is normally biased downwardly to a released position by a centering spring 91 which centers the movable member 65. As best shown in FIGS. 2 and 6, the spring 91 is a coiled spring having one end 93 engaged with extending flange 93 of the bracket 64 while the other end 95 of the spring 91 is engaged with the movable member 65 such that the spring can accommodate movement in opposite directions. The spring 91 is constructed and arranged such that in its relaxed condition, the diameter of the coils are large and when stressed, the coil diameter becomes smaller. With such spring structure, rotation of the movable member 65 directly affects the spring 91. When the movable member is centered by spring 91, the surfaces defining the slot 70 of the arm portion 68 of the movable member 65 engage the shaft 96 of the mounting member to maintain the locking structure 89 in its released position. In this position, the locking portions 94 are released from engagement with the notches 44 defined in the fixed track member 12, permitting the adjusting movements of the movable track members 14 to be affected.

Figure 3:
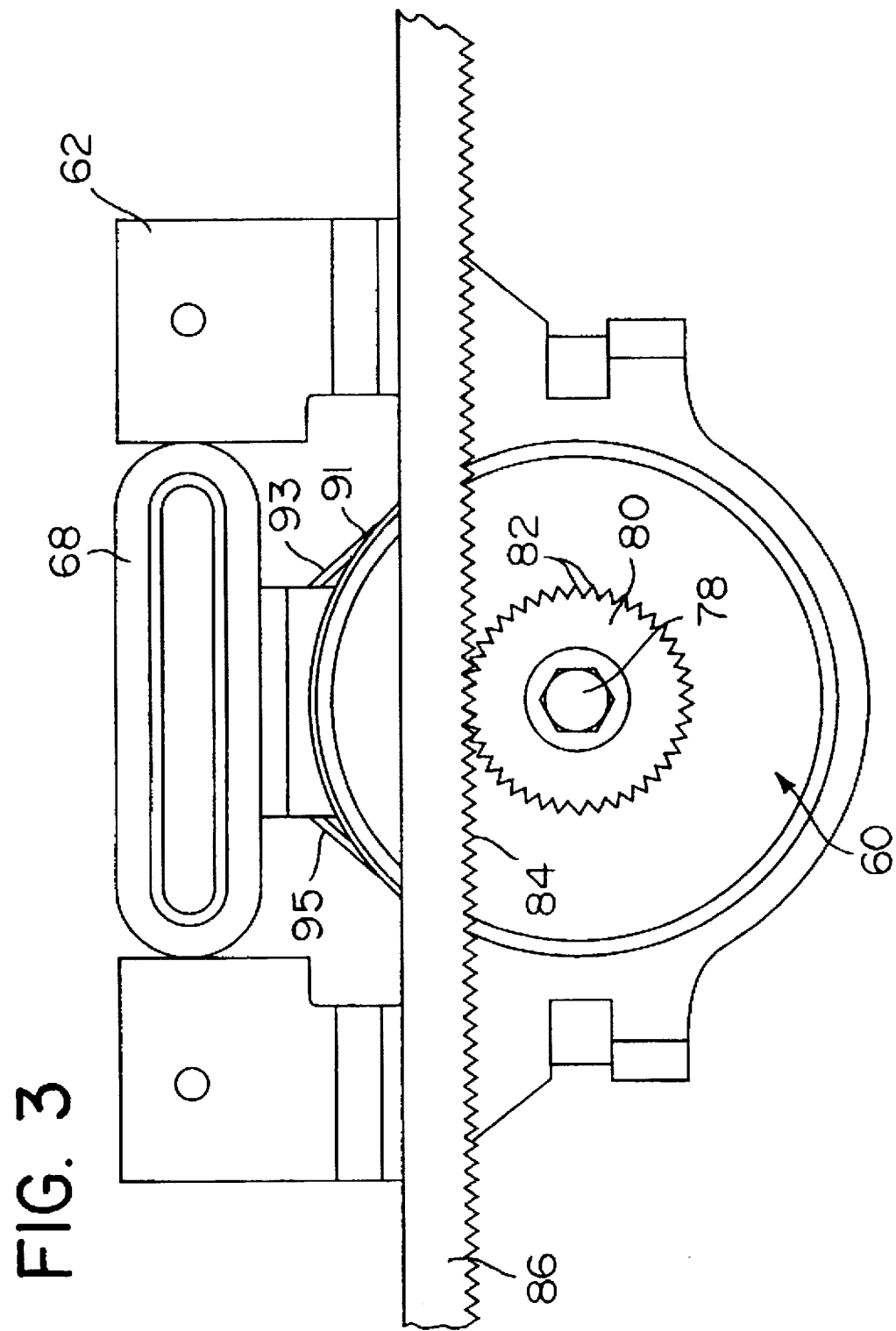
FIG. 3 is a rear view of the shock responsive structure of FIG. 2.

With reference to FIGS. 2 and 3, it can be appreciated that when the movable track members 14 are being adjusted in the fore and aft directions with the lock and release system in its released position, the pinion 80 moves along the rack 86. Such normal movement is generally a slow, continuous movement during which the fluid 76 does not transmit the movement of the shock responsive member 74 within the cavity 72 with the pinion 80 to the movable member 65. Instead, hydraulic slip of the shock responsive member 74 occurs (FIG. 5). Thus, the arm portion 68 of the movable member 65 will not rotate with the shock responsive member 74 and the arm portion is maintained in its normal, generally upright position (FIG. 3). Accordingly, the locking structure 89 is disposed in its lower, released position. However, if the locking and releasing device 42 of the adjusting mechanism is in its releasing position and the movable track members 14 are adjusted when a crash condition occurs, the fluid 76 will transmit sufficient accelerated movement of the shock responsive member 74 beyond which occurs by the sudden impulse to the movable member 65. When this occurs, the arm portion 68 will rotate together with the shock responsive member 74 and pinion 80 clockwise or counter-clockwise (depending upon the collision direction), to a position, for example, as shown in FIG. 4. This motion, against the bias of spring 91, causes the surfaces defining slot 70 to engage and move the shaft 96 and thus the mounting member 90 generally upwardly to the locked position thereof. In this position, the locking portions 94 of the abutting plates 92 engage with the notches 44 in the fixed track member 12 in the manner discussed above with regard to the operation of the locking and releasing device 42. Thus, the movable track members 14, which are joined via the U-shaped member 52, are locked with respect to the fixed track members 12 during the collision. Once the sudden impulse is over, the centering spring 91 biases the movable member 65 and arm portion 68 thereof to the normal, centered position which returns the locking structure 89 to its released position.

Although only one lock and release system 42 is shown associated with track assembly 11, it can be appreciated that if additional locking is required, a lock and release system may be associated with the other track assembly 13 as well.

The viscosity of the fluid in cavity 72 has an effect on the speed at which movement of the shock responsive member 74 will occur. Consequently, since the movement of the shock responsive member and thus the movable member 65 must overcome the resistance of the centering spring 91, the effect of changes in viscosity due to temperature changes can be offset by using a temperature sensitive spring. Thus, in the illustrated embodiment, the spring 91 is made of 55 NITINOL, a nickel-titanium alloy, to provide the offset. With such material, the colder the spring becomes, the stiffer the spring gets to compensate for temperature changes of the fluid in cavity 72.

It can be appreciated that the lock and release system of the invention provides an effective means of securing the movable track members 14 with respect to the fixed track members 12 during a crash condition, even when the adjusting mechanism is in a releasing position.

While the invention has been described in connection with what is presently considered to be the most practical and preferred embodiment, it is understood that the invention is not limited to the disclosed embodiment but, on the contrary, is intended to cover various modifications and equivalent arrangements included within the spirit and scope of the appended claims.

I claim:

1. A vehicle seat track assembly comprising:

an elongated fixed track structure constructed and arranged to be fixed with respect to a vehicle floor;

a movable track structure cooperable with said fixed track structure and constructed and arranged to support a portion of a seat thereon;

a plurality of rolling elements engaged between said track structures constructed and arranged to rollingly support said movable track structure on said fixed track structure to enable said movable track structure to be moved in opposite directions through a range of adjusting movements with respect to said fixed track structure;

an adjusting mechanism operatively associated with said track structures and constructed and arranged to permit said movable track structure to be moved through the adjusting movements, said adjusting mechanism including a locking and releasing device constructed and arranged to be moved between (1) a locking position preventing said adjusting movements from being affected and (2) a releasing position wherein said locking and releasing device is operable to release said adjusting mechanism to permit said adjusting movements, and a lock and release system operatively associated with said track structures and including a locking structure disposed in a released position permitting said adjusting movements during normal operating conditions and movable to a locked position preventing said adjusting movements from being affected, said lock and release system including a hydraulic coupling device having a hydraulic slip characteristic that allows the locking structure to remain in the released position during normal operating conditions and said hydraulic slip characteristic not occurring during a crash condition, thereby moving said locking structure from the released position to the locked position thereof in response to the crash condition which occurs while said locking and releasing device is in said releasing position.

2. The track assembly as according to claim 1, wherein said fixed track structure comprises a pair of fixed track members disposed in spaced relation, and said movable track structure comprises a pair of movable track members, a movable track member being cooperable with an associated fixed track member, said lock and release system being associated with at least one of the pairs of cooperating track members.

3. The track assembly as defined in claim 1, wherein said fixed track structure comprises a fixed track member including an elongated lower central portion having a pair of elongated upstanding leg portions extending upwardly therefrom terminating in a pair of upwardly facing convex portions having depending free end portions, and said movable track structure comprises a movable track member including an elongated upper central portion having a pair of elongated transversely spaced downwardly facing convex depressions formed therein and a pair of elongated depending leg portions extending downwardly therefrom terminating in a pair of downwardly facing convex portions having upstanding free end portions, said track members being constructed and arranged in cooperating relation to one another so that the pair of upwardly facing convex portions of said fixed track member are disposed below the pair of downwardly facing convex depressions and above the upstanding free end portions of said movable track member.

4. A vehicle seat track assembly comprising:

an elongated fixed track structure constructed and arranged to be fixed with respect to a vehicle floor;

a movable track structure cooperable with said fixed track structure and constructed and arranged to support a portion of a seat thereon;

a plurality of rolling elements engaged between said track structures constructed and arranged to rollingly support said movable track structure on said fixed track structure to enable said movable track structure to be moved in opposite directions through a range of adjusting movements with respect to said fixed track structure;

an adjusting mechanism operatively associated with said track structures and constructed and ganged permit said movable track structure to be moved through the adjusting movements, said adjusting mechanism including a locking and releasing device constructed and arranged to be moved between (1) a locking position preventing said adjusting movements from being affected and (2) a releasing position wherein said locking and releasing device is operable to release said adjusting mechanism to permit said adjusting movements, a lock and release system operatively associated with said track structures and including a locking structure disposed in a released position permitting said adjusting movements during normal operating conditions and movable to a locked position preventing said adjusting movements from being affected, said lock and release system including a shock responsive structure constructed and arranged to move said locking structure from the released position to the locked position thereof in response to a crash condition which occurs while said locking and releasing device is in said releasing position, and wherein the shock responsive structure comprises a bracket fixed to said movable track structure and a movable member mounted for rotational movement with respect to said bracket, said movable member, being operable to move said locking structure between the released and locked positions thereof and said movable member defining an interior cavity filled with fluid, said shock responsive structure including a shock responsive member received in said cavity and being coupled to said movable member in such a manner that during a crash condition, said movable member will rotate together with said shock responsive member moving said locking structure to the locked position thereof and during normal operating conditions, said shock responsive member will rotate without causing rotation of said movable member maintaining said locking structure in the released position thereof.

5. The track assembly according to claim 4, wherein said shock responsive member is operatively associated with a pinion, and said track assembly further includes a rack structure fixedly mounted with respect to said fixed track structure, said rack structure being constructed and arranged to be in toothed intermeshing relation with said pinion, said locking structure including a mounting structure carrying locking members, said mounting structure being operatively associated with said movable member, said movable member being normally biased into a centered position wherein said mounting structure is disposed in a released position with said locking members removed from locking engagement with said fixed track structure, said mounting structure, said shock responsive member, said movable member and said fluid being constructed and arranged such that when said locking and releasing device is in said releasing position and said movable track structure is moved through said adjusting movements, said pinion moves in intermeshing relation with respect to said rack structure and (1) the fluid does not transmit the movement of said shock responsive member within said cavity with said pinion during normal movement of said pinion to said movable member which maintains said mounting structure in the released position thereof, and (2) during a crash condition causing accelerated movement of said pinion beyond normal, the fluid transmits sufficient accelerated movement of said shock responsive member within said cavity with said pinion, to said movable member which in turn moves said mounting structure to a locked position locking said movable track structure with respect to said fixed track structure.

6. The track assembly according to claim 5, wherein said movable member includes an arm portion having a slot therein, and said mounting structure includes a shaft extending therefrom, said shaft being received in said slot in such a manner that when said mounting structure is in said centered position, surfaces defining said slot engage said shaft to maintain said mounting member in the released position thereof, said fixed track structure including a plurality of notches therein operatively associated with said locking members such that when a crash condition occurs, rotation of said movable member together with said arm portion thereof causes surfaces defining said slot to engage said shaft and move said mounting structure generally upwardly to the locked position thereof with said locking members engaged with certain of said notches.

7. The track assembly according to claim 5, wherein said rack structure ms fixed to a mounting bracket, said mounting bracket being fixed to said fixed track structure, said rack structure extending along a length of said movable track structure so as to accommodate said adjusting movements thereof.

8. The track assembly according to claim 5, wherein said movable member is biased to said centered position thereof by a spring, said spring being a temperature sensitive spring constructed and arranged to change stiffness in response to changes in temperature such that said spring offsets viscosity changes of the fluid in said interior cavity due to changes in temperature of the fluid.

9. The track assembly according to claim 8, wherein said spring is comprised of a nickel-titanium alloy.

10. The track assembly as according to claim 4, wherein said fixed track structure comprises a pair of fixed track members disposed in spaced relation, and said movable track structure comprises pair of movable track members, a movable track member being cooperable with an associated fixed track member, said lock and release system being associated with at least one of the pairs of cooperating track members.

11. The track assembly according to claim 4, wherein said fixed track structure comprises a fixed track member including in elongated lower central portion having a pair of elongated upstanding leg portions extending upwardly therefrom terminating in a pair of upwardly facing convex portions having depending free end portions, and said movable track structure comprises a movable track member including an elongated upper central portion having a pair of elongated transversely spaced downwardly facing convex depressions formed therein and a pair of elongated depending leg portions extending downwardly therefrom terminating in a pair of downwardly facing convex portions having upstanding free end portions, said track members being constructed and arranged in cooperating relation to one another so that the pair of upwardly facing convex portions of said fixed track member are disposed below the pair of downwardly facing convex depressions and above the upstanding free end portions of said movable track member.

* * * * *

UNITED STATES PATENT AND TRADEMARK OFFICE
CERTIFICATE OF CORRRECTION

PATENT NO. : 5,732,923  
DATED : March 31, 1998  
INVENTOR(S) : Tame Page 1 of 3

It is certified that error appears in the above-identified patent and that said Letters Patent is hereby corrected as shown below:

On the title page, item [56] add the following

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 5 | 2 | 0 | 1 | 3 | 9 | 1 | 04/1993 | ARAI | | | |
| | | | | | | | | | | | | | |

UNITED STATES PATENT AND TRADEMARK OFFICE
CERTIFICATE OF CORRRECTION

PATENT NO. : 5,732,923
DATED : March 31, 1998
INVENTOR(S) : Tame

It is certified that error appears in the above-identified patent and that said Letters Patent is hereby corrected as shown below:

On the title page, item [56] add the following

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | 2 | 2 | 5 | 3 | 9 | 9 | 9A | 09/1992 | UK | | | | |
| | | DE | 29 | 50 | 6 | 5 | 6 | 6 | 07/1995 | GERMANY | | | | |
| | | WO | 97 | /1 | 0 | 1 | 1 | 6 | 03/1997 | PCT | | | | |
| | | | | | | | | | | | | | | |

UNITED STATES PATENT AND TRADEMARK OFFICE
CERTIFICATE OF CORRRECTION

PATENT NO. : 5,732,923
DATED : March 31, 1998
INVENTOR(S) : Tame

It is certified that error appears in the above-identified patent and that said Letters Patent is hereby corrected as shown below:

On the title page, item [56] add the following

OTHER DOCUMENTS

| | |
|---|---|
| | PATENT ABSTRACTS OF JAPAN, No. 08 324311 A, Vol. 097, No. 004, "Emergency Locking Seat Slide Device", December 10, 1996. |
| | |

Signed and Sealed this

Sixth Day of April, 1999

Attest:

Q. TODD DICKINSON

*Attesting Officer*    Acting Commissioner of Patents and Trademarks